Sept. 29, 1959           C. J. KRIEGER           2,907,008
MULTI-CHANNEL VARIABLE MAGNETIC DELAY DEVICE
Filed May 7, 1956           2 Sheets-Sheet 1
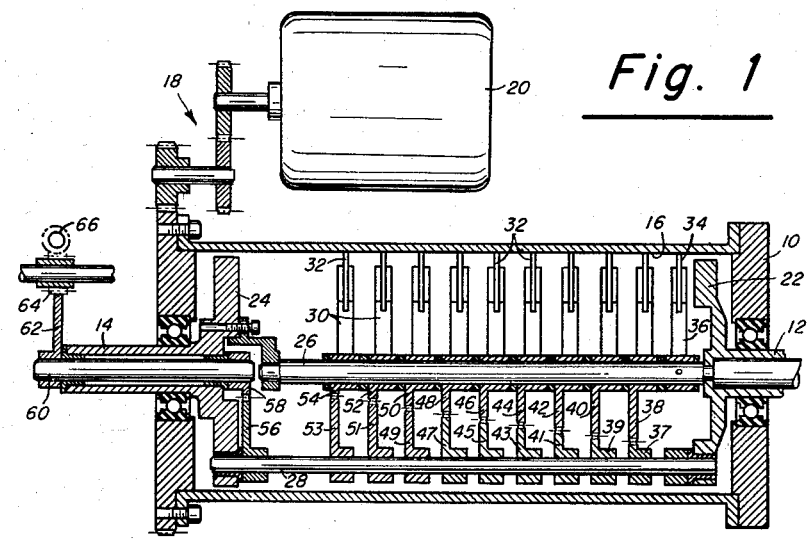
*Fig. 1*
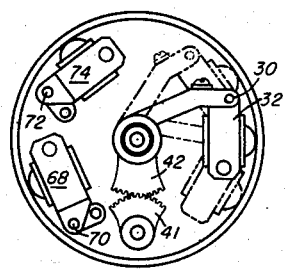
*Fig. 2*
*Fig. 3*
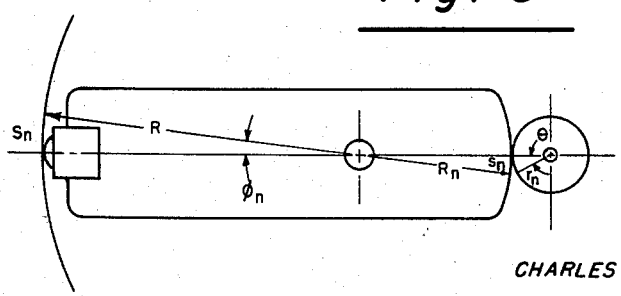
INVENTOR.
CHARLES J. KRIEGER
BY
*George E. Pearson*
ATTORNEYS Sept. 29, 1959  C. J. KRIEGER  2,907,008
MULTI-CHANNEL VARIABLE MAGNETIC DELAY DEVICE
Filed May 7, 1956

INVENTOR.
CHARLES J. KRIEGER
BY
George E. Pearson
ATTORNEYS

United States Patent Office 2,907,008
Patented Sept. 29, 1959

2,907,008

MULTI-CHANNEL VARIABLE MAGNETIC DELAY DEVICE

Charles J. Krieger, San Diego, Calif., assignor to the United States of America as represented by the Secretary of the Navy Application May 7, 1956, Serial No. 583,339

3 Claims. (Cl. 340—174)

(Granted under Title 35, U.S. Code (1952), sec. 266)

The invention described herein may be manufactured and used by or for the Government of the United States of America for governmental purposes without the payment of any royalties thereon or therefor.

The present invention relates to multi-channel variable magnetic delay apparatus and more particularly to such apparatus which can provide simultaneous and continuously variable delay in several signal channels while maintaining a fixed predetermined relation between said delays.

An exemplary system in which the present invention may be utilized is designed with the determination of the bearing of a distance sound source as one of its functions. Such exemplary system effects the phasing of an array of acoustical receivers by means of the introduction of electrical delay elements into each receiver circuit whereby the relative travel time differences of a plane sound wave between the sound source and each receiver is compensated by equal and opposite delays introduced in the individual receiver circuits. Since the travel time differences are directly related to the bearing of the sound source relative to a reference line of the array, the amount of delay required to cause the signals in each receiver circuit to coincide in time yields a direct indication of the bearing. In addition to the electrical delay elements, there have been proposed various magnetic delay devices embodying rotating disk, cylinder or sphere or traveling tape or belt. One or more of several basic defects and limitations are inherent in each of such devices. One such limitation is the control of delay between two channels only. Another is the lack of simultaneous control of the changes of delay while maintaining a fixed ratio or other predetermined relation between the delays.

Where the magnetic storage medium is carried by a rotating sphere or cylinder, variation of the delay introduces the problem of maintaining reading or recording heads in proper physical relation to the medium. With a traveling belt or tape there arises the problem of simultaneously moving several reading or recording heads by different amounts without disturbing the alignment and orientation thereof.

The present invention embodies a rotating hollow cylinder carrying a magnetic storage medium on its internal peripheral surface. A set of reading heads and a set of recording heads, one set of which is fixed, are contained wholly within the cylinder. The heads of the movable set are simultaneously advanced circumferentially with respect to the cylinder by gears whose ratios increase from the first to the last head so that a given turn of a gear shaft will produce increasing displacements of the movable heads and increasing signal storage times which displacements and times are maintained in a fixed relation. The signals from the hydrophones or receivers are amplified and recorded on the magnetic medium. They are then picked up by the reading or reproduce heads, combined and presented to the observer. When the gear shaft has been adjusted so that the signals coincide in time, the observed combined signal is maximum and the angular position of the gear shaft serves to indicate the bearing of the sound source.

In a second embodiment of the invention utilizing a traveling magnetic belt, the movable set of heads is mounted on a pivoted bar and means are provided for preventing rotation of each movable head and for preventing movement thereof transverse to the direction of belt movement whereby narrow storage channels and standard heads can be utilized.

It is an object of this invention to simultaneously and continuously delay a plurality of signals in amounts having a fixed predetermined relation.

Another object of this invention is the storage of signals for selectively variable times without changing the relation of said storage times to each other.

Still another object of this invention is the simultaneous variation of storage times of a plurality of signals by unequal amounts bearing fixed ratios to each other.

A further object of this invention is the simultaneous and continuous variation of storage times of a plurality of signals on a magnetic medium in accordance with a predetermined relation and without requiring specially designed magnetic heads.

A more specific object of this invention is the magnetic phasing of an array of sonic receivers.

A further object of this invention is the movement of a magnetic head without disturbing the alignment or orientation thereof.

Other objects and many of the attendant advantages of this invention will be readily appreciated as the same becomes better understood by reference to the following detailed description when considered in connection with the accompanying drawings wherein:

Fig. 1 is a sectional view of one form of the invention;

Fig. 2 is a sectional view of the structure of Fig. 1 showing in phantom several positions of certain movable parts;

Fig. 3 is a diagrammatic illustration of the gear drive of Fig. 1;

In the drawings like numerals refer to like parts.

Figure 4:
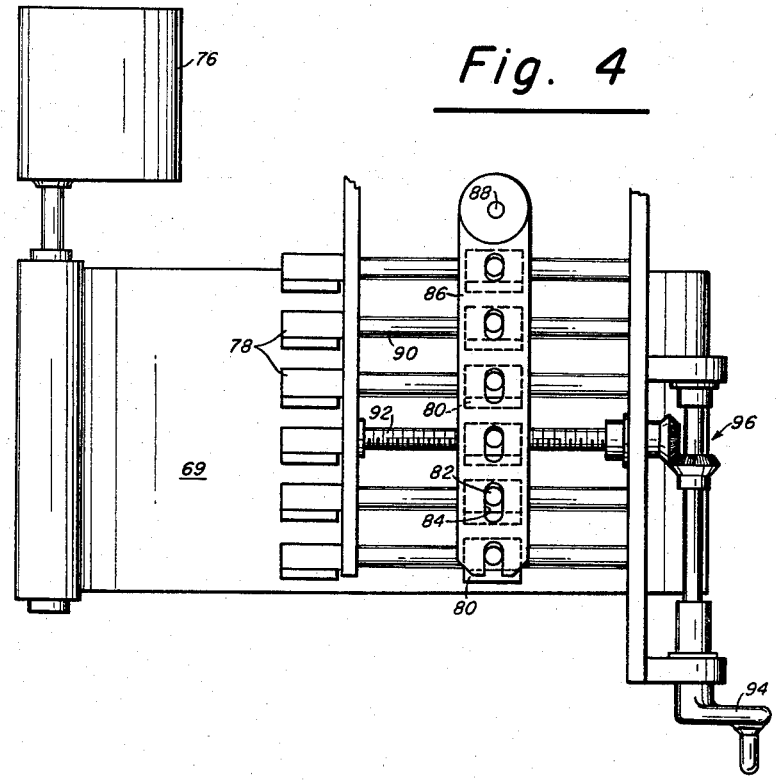
Fig. 4 illustrates a modified form of the invention.

Axially journalled on hub assemblies 12, 14 (Fig. 1) which are suitably secured to a fixed support (not shown), is a hollow cylinder or drum 10 carrying, as by magnetically plating, a layer of magnetic storage medium on the internal peripheral surface 16 thereof and rotatably driven through gearing 18 by a fixedly mounted motor 20. Hub assemblies 12, 14 have respectively secured thereto fixed end plates 22, 24 which carry a fixed shaft 26 aligned with the cylinder axis and a journalled shaft 28. Entirely contained within drum 10 and individually mounted for independent rotation about shaft 26 and the drum axis is a set of arms 30 each of which carries a recording head 32 which may be, for example, Brush Model BK–1501 Series Multi-channel Record and Reproduce elements contacting the rotatable magnetic medium of the drum. A fixed head 34 is carried by arm 36 which is fixed to shaft 26. Lateral and circumferential adjustments of the heads relative to arms 30 may be provided for limited initial adjustment. Each arm 30 has rigidly secured thereto one of even numbered gears 38–54 of progressively decreasing size which respectively mesh with odd numbered gears 37–53 of a set of gears of progressively increasing size which are fixed to shaft 28. Shaft 28 may be manually rotated through gears 56, 58, rod 60, and gears 62, 64 by means of a worm 66 which may also be connected with a dial (not shown) for indicating the angular position of shaft 28.

A set of reproducing or reading heads 68 (of which but one is shown) are fixedly carried by rod 70 which is secured at its ends to plates 22, 24 while a similarly secured rod 72 fixedly carries a set of erase heads 74. Corresponding heads in the three sets of record, read and erase heads are mutually aligned in parallel circumferential channels of the recording medium.

For the phasing of a linear array of equi-spaced hydrophones the gears are designed to advance the record heads along the inner surface of the rotating magnetic cylinder by distances which form an arithmetic progression. While the described embodiment employs movable recording heads, it will be readily appreciated that this is but a matter of choice since the record heads may be fixed and the reading heads may be gear driven.

For any pair of gears (Fig. 3)

$$\frac{S_n}{s_n} = \frac{R}{R_n}; \quad s_n = r_n \theta^{\text{rad}}; \quad S_n = \frac{r_n}{R_n} \cdot R\theta^{\text{rad}}.$$

where $$\frac{r_n}{R_n}$$

is the gear ratio and $\theta$ is the angle in radians through which the gears with radii $r_n$ rotate, $\theta_n$ is the corresponding angle through which the gear with radius $R_n$ rotates, $S_n$ and $s_n$ being the arcs intercepted by the angle $\phi_n$ on circles of radii $R$ and $R_n$ respectively. $R$ equals the inside radius of the magnetic cylinder. The sum $K = R_n + r_n$ is the same for all pairs.

Assume ten sets of gears numbered from 0 through 9. Let $$\frac{r_0}{R_0} = 0$$

and $$\frac{r_9}{R_9} = 3$$

and generally, $$\frac{r_n}{R_n} = \frac{n}{3}$$

Thus, the gear ratio will be the required arithmetical progression with 1/3 as the common difference.

Let the inside radius $R$ of the magnetic cylinder be 1.875 inches and let the spacing between gear centers be 1.500 inches, i.e.:

$$R_n + r_n = 1.500 \text{ inches}$$

Solving for $R_n$ $$R_n = \frac{4.50}{3+n} \text{ inches}$$

The maximum displacement of Record Head No. 9 corresponding to a delay time of 60 milliseconds (300 feet in water), and assuming a surface speed of the magnetic cylinder of 15 inches per second, is $$S_9 = 15 \times 0.060 = 0.90 \text{ inch.}$$

The angular displacement of Record Head No. 9

$$\phi_9 = \frac{S_9}{R} = \frac{0.90}{1.875} = 0.48 \text{ radian or } 27.5 \text{ degrees}$$

and that of the gear with radius $r_9$ (and all other gears with radii $r_n$)

$$\theta = \frac{S_n}{\frac{r_n}{R_n} \cdot R} = 0.16 \text{ radain or } 9.2 \text{ degrees}$$

The record heads are advanced in either direction by means of worm gear 66 acting through two sets of gears 62, 64, and 56, 58 on the shaft 28 on which the odd numbered gears 37–53 with radii $r_n$ are mounted rigidly. These in turn act on the even numbered gears 38–54 with radii $R_n$ which turn freely on their shaft. The record heads are attached to these gears.

It will be seen that the distance between the heads of any corresponding pair of read and record heads bears a fixed relation to the distance between the heads of any other pair of corresponding read and record heads regardless of the angular position of shaft 28 and the heads of the movable set. So, too, the angular position $\phi$ of any head of the movable set always bears a fixed relation to the angular position of each of the other heads of the movable set. This is true by reason of the fact that $$S_n = \frac{r_n}{R_n} \cdot R\theta$$

where $$\frac{r_n}{R_n} \cdot R$$

is a constant $C_n$ for the $n$th head. Therefore the ratio $S'/S_2$ of any two heads is constant. So, too, since $$\phi_n = \frac{S_n}{R}$$

the ratio $\phi'/\phi_2$ of the angular displacements of any two heads is constant.

To permit continuous operation of the apparatus the magnetic state or magnetic flux of each channel, after being varied by the recording heads and sensed by reading heads, is returned to initial state by the erase heads before the affected magnetic channel portion has made one complete revolution.

Figure 5:
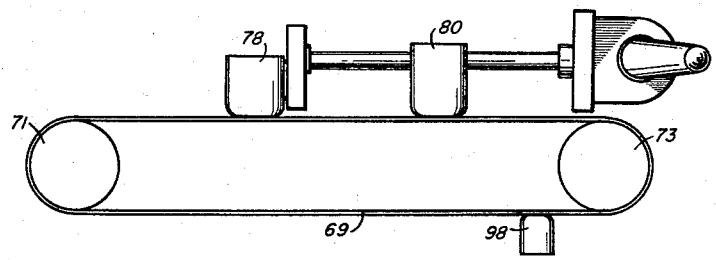
Fig. 5 is a side view of Fig. 4 showing in phantom an adjusted position.

Another manner of obtaining simultaneously and continuously variable delays in fixed ratios, as shown in Figs. 4 and 5, utilizes conventional recording and reproduce heads arranged on straight lines which may be angularly shifted relative to each other to introduce the desired delay. The delay required is proportional to the distance of a receiving element of a linear array from a reference element and to the bearing of the target.

A required time delay $t$ can be obtained by a relative displacement $x$ between the recording and reproducing heads as follows:

$$t = \frac{x}{v}$$

where $v$ is the speed of the magnetic medium. The lower the velocity $v$, the smaller the displacement $x$ which is necessary to produce the required delay.

Choosing $t = 0.09$ sec., as an example, $x = vt$ and with $$v = 3 \frac{\text{in}}{\text{sec}}$$

$x = 0.27$ in. Displacements of this order of magnitude can be readily obtained. If $t = 0.09$ sec. represents the relative delay between the two extreme elements, the delays required for the intermediate elements can be obtained by displacing all elements with a pivoted bar since then all delays will be proportional to the distances from the pivot point. The heads can be kept parallel to each other and therefore commercial heads can be used.

The magnetic medium may well be a magnetic belt since its speed is not excessive. If the magnetic heads are located where the belt moves in a plane, then the displacement of the heads is accomplished in the simplest manner. (Figs. 4 and 5.)

A magnetic belt 69 entrained over rollers 71, 73 is continuously driven at fixed speed by motor 76 across a set of fixedly mounted reproduce heads 78 which sense the magnetic flux variation, in respective parallel channels, created by an angularly swingable set of recording heads 80. Each of heads 80 is pivotally and slidably connected by pin 82 and slot 84 to a rigid arm 86 which is mounted for rotation about axis 88 in a plane parallel to the planar portion of the path of belt travel. All but one of heads 80 have the movement thereof confined to a direction parallel to the direction of belt travel by means of fixed guide rods which are slidably received in respective apertures of the heads. The remaining one of the recording heads, instead of slidably receiving a guide rod, is formed with an internally threaded aperture threadedly receiving a journalled screw 92 which is rotated by means of handle 94 and gears 96 to effect rotation of the arm 86 and heads 80 as a unit about pivot 88. A set of erase heads 98 may be provided to permit continuous operation as in the first mentioned embodiment and suitable means (not shown) may be connected with parts 94, 96 to indicate the angular position of arm 86.

It will be seen that each of the forms of the invention described above satisfy three principal requirements regarding multi-channel delays, (a) fixed ratios, (b) continuous variation and (c) simultaneous variation.

Obviously many modifications and variations of the present invention are possible in the light of the above teachings. It is therefore to be understood that within the scope of the appended claims the invention may be practiced otherwise than as specifically described.

What is claimed is:

1. A multi-channel variable magnetic delay apparatus comprising a movable magnetic storage medium on the internal surface of a rotating drum, a structure housed and axially mounted within said drum for operably supporting two or more magnetic recording heads in combination with two or more magnetic reading heads aligned in spaced cooperating pairs for parallel tracking on said medium, and means activated by a force exerted external of said drum and independent of the power used for rotating the magnetic storage medium for simultaneously adjusting the space between said cooperating pairs of heads in progressive arithmetical increments along the tracking paths.

2. The apparatus set forth in claim 1 including two or more erasing heads mounted on the same structure supporting the recording and reading heads for erasing the magnetic recording during each revolution of the drum, said reading and erasing heads being maintained in a fixed position relative to the arcuate movement of the recording heads.

3. A multi-channel delay apparatus comprising a cylindrical magnetic storage drum rotatively mounted on end bushings of a combination magnetic recording reading and erasing head structure and providing a protective housing for said structure, said head structure comprising end plates fixed respectively to said bushings and integrally connected by an axial shaft aligned with the drum axis, an offset shaft journalled in said end plates and mounted parallel with the axial shaft, a plurality of recording elements journalled on the axial shaft and carrying recording heads adjacent the internal periphery of said drum, a plurality of progressively decreasing sized gears fixed to said axial shaft and integrally connected to said recording heads respectively, a plurality of progressively increasing sized gears rotatively fixed to said offset shaft and meshing with first mentioned plurality of gears respectively, a gear and shaft linkage connected to said offset shaft whereby said progressively decreasing sized gears may be rotated by a power source external of said drum and said recording heads moved in progressively arithmetical increments along peripherial circumferentially parallel paths on the internal surface of the drum, a plurality of reading heads fixedly mounted on a rod parallel with the axial shaft and terminating in said end plates, said reading heads located adjacent the internal surface of said drum and in circumferential alignment respectively with said recording heads, a plurality of erasing heads fixedly mounted on a rod parallel with the axial shaft and terminating in said end plates, said erasing heads located adjacent the internal surface of said drum and in circumferential alignment respectively with said recording heads, and means for rotating said drum to a predetermined rate independent of the power source employed for moving the recording heads.

References Cited in the file of this patent
UNITED STATES PATENTS

| | | |
|---|---|---|
| 2,620,890 | Lee | Dec. 9, 1952 |
| 2,732,025 | Lee | Jan. 24, 1956 |
| 2,765,455 | Meiners | Oct. 2, 1956 |
| 2,838,743 | Fredriksson | June 10, 1958 |